(12) United States Patent
Labat et al.

(10) Patent No.: US 11,319,428 B2
(45) Date of Patent: May 3, 2022

(54) FIRE-RETARDANT COMPOSITIONS

(71) Applicants: Université de Pau et des Pays de l'Adour, Pau (FR); Centre National De La Recherche Scientifique, Paris (FR); INSTITUT TECHNOLOGIQUE FCBA, Champs sur Marne (FR)

(72) Inventors: Gilles Labat, Bordeaux (FR); Céline Baguenard, Communay (FR); Laurent Billon, Saint-Faust (FR)

(73) Assignees: UNIVERSITÉ DE PAU ET DES PAYS DE L'ADOUR, Pau (FR); CENTRE NATIONAL DE LA RECHERCHE SCIENTIFIQUE, Paris (FR); INSTITUT TECHNOLOGIQUE FCBA, Champs-sur-Marne (FR)

( * ) Notice: Subject to any disclaimer, the term of this patent is extended or adjusted under 35 U.S.C. 154(b) by 47 days.

(21) Appl. No.: 16/346,968

(22) PCT Filed: Nov. 3, 2017

(86) PCT No.: PCT/EP2017/078240
§ 371 (c)(1),
(2) Date: May 2, 2019

(87) PCT Pub. No.: WO2018/083269
PCT Pub. Date: May 11, 2018

(65) Prior Publication Data
US 2020/0062932 A1    Feb. 27, 2020

(30) Foreign Application Priority Data
Nov. 3, 2016 (FR) ...................... 1660640

(51) Int. Cl.
*C08L 5/08* (2006.01)
*B05D 1/02* (2006.01)
(Continued)

(52) U.S. Cl.
CPC .................. *C08L 5/08* (2013.01); *B05D 1/02* (2013.01); *B05D 1/18* (2013.01); *C08K 3/34* (2013.01);
(Continued)

(58) Field of Classification Search
CPC .... C08L 5/08; C08L 2201/02; C08L 2201/54; B05D 1/02; B05D 1/18; C08K 3/34;
(Continued)

(56) References Cited

U.S. PATENT DOCUMENTS

| 2009/0048377 A1* | 2/2009 | Kanno ..................... C08K 5/49 524/117 |
| 2013/0052116 A1* | 2/2013 | Barney ................... B32B 9/047 423/331 |
| 2016/0122568 A1* | 5/2016 | Catchmark .............. C08L 1/02 106/162.2 |

FOREIGN PATENT DOCUMENTS

| CN | 103 408 245 | 11/2013 |
| CN | 104 212 265 | 12/2014 |

(Continued)

OTHER PUBLICATIONS

International Search Report, PCT/EP2017/078240, dated Feb. 22, 2018.

*Primary Examiner* — Andrew J. Oyer
(74) *Attorney, Agent, or Firm* — Nixon & Vanderhye

(57) ABSTRACT

Disclosed is a method for the use, as fire-retardant, of an aqueous composition including chitosan and at least one mineral filler, the inorganic filler being for example chosen from the group of mineral fillers in laminae, in particular
(Continued)

chosen from the group consisting of talc, montmorillonite, saponite, sepiolite, bentonite, smectite, hectorite, kaolinite, halloysite and mica, and mixtures thereof.

19 Claims, 4 Drawing Sheets

(51) Int. Cl.
  *B05D 1/18* (2006.01)
  *C08K 3/34* (2006.01)
  *C08K 5/00* (2006.01)
  *C08K 5/09* (2006.01)

(52) U.S. Cl.
  CPC .............. *C08K 5/0066* (2013.01); *C08K 5/09* (2013.01); *C08L 2201/02* (2013.01); *C08L 2201/54* (2013.01)

(58) Field of Classification Search
  CPC ...... C08K 5/0066; C08K 5/09; C09D 105/08; C09D 7/61; C09D 7/70; C09D 5/18; D06M 2200/30; D06M 11/11; D06M 11/79; D06M 13/184; D06M 15/03; C09K 21/14; B27N 9/00
  See application file for complete search history.

(56) References Cited

FOREIGN PATENT DOCUMENTS

| | | |
|---|---|---|
| CN | 104 532 252 | 4/2015 |
| CN | 105 061 860 | 11/2015 |
| EP | 1 134 258 | 9/2001 |
| JP | 04 320457 | 11/1992 |
| JP | 06 297409 | 10/1994 |
| WO | WO 2012/007697 | 1/2012 |

\* cited by examiner

FIRE-RETARDANT COMPOSITIONS

BACKGROUND OF THE INVENTION

Field of the Invention

The subject of the present invention is new fire-retardant compositions, as well as their method of preparation. It also relates to the use of the compositions for the fire-retardant treatment of a surface or a volume (mass treatment).

In France and Europe, building materials such as cladding or insulation must have a fire classification in accordance with the fire regulations for buildings that are open to the public. This requires the provision of fireproofing and its improved durability. The most common fire-retardant treatments are based on two principles, surface treatment (by application of intumescent system for example), or mass treatment (integration of fireproofing salts, most often based on boron or ammonium polyphosphate), or subsequent addition by autoclave treatment, for example). The development of new generations of admixtures has become a priority issue with the aim, on the one hand, of improving the durability of the fire-retardant treatments of the wood material for indoor and outdoor use (cladding, decking . . . ) and, on the other hand, the deployment of novel production processes with low environmental and health impact.

New systems must be positioned in line with the levels of performance requirements required for each area of application of the material (regulations, directives, standards, etc.). The expectation is strong in the wood and bio-based materials' sector to facilitate their use and for the development of timber construction. This must contribute to the sensible and secure specification and use of plant fiber based insulation.

It is therefore important to deal with the reaction and spread of fire in the case of wood products. It is also a key element for the use of cladding elements and for insulation based on plant fiber.

Description of the Related Art

In addition, until 2011, insulation based on cellulose wadding was treated with boron salts to increase their resistance to fire and mold. Under the biocidal directive, boric acid and its salts have been banned as antifungal agents because of their category 2 classification in the European Union. Manufacturers have therefore proposed substitute products based on ammonium salts. However, ammonia emissions were found in some cases of insulation based on cellulose wadding. To date, it is therefore important to find substitutes for these two products. These solutions must be lasting and sustainable, with a low health impact and preferably biobased or natural.

BRIEF SUMMARY OF THE INVENTION

The present invention therefore aims to provide a new fire-retardant treatment with low impact health and sustainable.

The present invention also aims to provide a new fire-retardant composition of biosourced or natural origin.

The present invention also aims to provide a new fire-retardant composition as a substitute for current fire-retardant treatments based on boron salts or ammonium polyphosphate.

The present invention also aims to provide a new biosourced or natural fire-retardant composition limiting the use of raw petrochemical materials.

The present invention also aims to provide a fire-retardant composition offering insulating performance of the treated products that is equivalent or improved, compared to known compositions.

Thus, the present invention relates to the use of an aqueous composition comprising chitosan and at least one inorganic filler, as fire-retardant.

The present invention also relates to an aqueous fire-retardant composition comprising chitosan and at least one inorganic filler.

In particular, the intended application is the surface treatment of panels based on wood fibers. The aforementioned aqueous composition may also be used for volume treatment.

The present invention therefore relates to a fire-retardant, aqueous, biosourced and organic/inorganic hybrid formulation based on biobased polymers and mineral fillers of natural origin capable of interacting with each other as well as with the lignocellulosic support by low energy bonds to ensure the durability of the coating or treatment.

According to one embodiment, the mineral filler is chosen from the group of mineral fillers in layers, in particular chosen from the group consisting of: talc, montmorillonite, saponite, sepiolite, bentonite, smectite, hectorite, kaolinite, halloysite, and mica, and mixtures thereof.

According to a preferred embodiment, the mineral filler is montmorillonite or talc.

Preferably, in the abovementioned aqueous compositions used according to the invention, the content by weight of chitosan is between 20% and 99.99% by weight relative to the weight of dry extract of the mixture formed by chitosan and the mineral filler, while the content by weight of mineral filler is between 0.01% and 80% by weight relative to the weight of dry extract of the mixture formed by chitosan and the mineral filler.

Preferably, the content of chitosan is between 20% and 80% by weight relative to the weight of dry extract of the mixture formed by chitosan and the mineral filler.

The content by weight of inorganic filler is preferably between 80% and 20% by weight of dry extract of the mixture formed by chitosan and the mineral filler.

According to one embodiment, the aqueous composition used according to the invention comprises from 0.01% to 25% by weight of dry extract of the mixture formed by chitosan and the inorganic filler with respect to the total weight of the composition.

The content by weight of dry extract of the mixture formed by chitosan and the mineral filler varies, in particular, according to the forming process.

Preferably, the aqueous composition used according to the invention comprises from 3.5% to 7.5% by weight of dry extract of the mixture formed by chitosan and the mineral filler with respect to the total weight of the composition.

The aqueous composition used according to the invention may also comprise at least one acid.

Among the acids used according to the invention, mention may be made, in particular, of those described in the article: Romanazzi, G., Mlikota Gabler, F., Margosan, D., Mackey, B E, and Smilanick, J. 2009. Effect of chitosan dissolved in different acids on its ability to control postharvest Phytopathology 99: 1028-1036.

Preferably, the acid is selected from the group consisting of: acetic acid, hydrochloric acid, formic acid, L-ascorbic acid, L-glutamic acid, lactic acid, maleic acid, malic acid and succinic acid, and mixtures thereof.

According to a preferred embodiment, the composition used according to the invention comprises acetic acid.

According to one embodiment, the composition used according to the invention does not comprise ricinoleic acid.

According to one embodiment, the aqueous composition used according to the invention has an acidic pH, in particular between 3 and 6, and preferably between 4 and 5.

Preferably, the number-average molar mass Mn of chitosan is between 50,000 g/mol and 200,000 g/mol, preferably between 65,000 and 150,000 g/mol to promote the deposition of the formulation by a spray method (viscosity adjustment).

Chitosan is produced by deacetylation of chitin, constituting shells of crustacean, cuttlefish or squid bones or mushroom walls. The degree of deacetylation (DD) indicates the percentage of amine groups on these chains. A chitosan with a degree of deacetylation (DD) of 85% has 85% of amine groups and 15% of acetyl groups on its chains. Preferably, the desired deacetylation rate is as high as possible in order to protonate the amine groups in acidic medium.

Preferably, the degree of deacetylation (DD) of chitosan is between 75% and 95%, preferably between 85% and 92%.

The degree of deacetylation was measured by $^1$H NMR.

A degree of deacetylation of 50% to 60% is the limit between chitin and chitosan. A degree of deacetylation higher than these values characterizes soluble chitosan in acidic aqueous medium while chitin is insoluble. A large number of amine groups are sought to have an interaction in acidic aqueous medium with the mineral fillers.

According to one embodiment, the aqueous composition used according to the invention has a dynamic viscosity, measured at 25° C. and at a shear rate of 2 s$^{-1}$, comprised between 0.1 Pa·s and 1000 Pa·s. preferably between 0.15 Pa·s and 7 Pa·s.

Dynamic viscosity was measured with a Bohlin rheometer over a range of shear rates from 2 to 200 s$^{-1}$.

Thus, the present invention relates to a fire-retardant formulation composed of chitosan, solubilized in aqueous phase by lowering the pH with a small amount of an acid such as acetic acid, and mineral fillers, such as montmorillonite or talc, in suspension. Chitosan, cationic and film-forming, acts as a binder between the wood support (or cellulose) and the mineral fillers. As a natural polymer, it is also a good source of carbon to form a protective charcoal layer when exposed to flame. Mineral fillers, because of their structure in layers, form a barrier to flammable gases resulting from the degradation of the material, thus reducing the propagation of the flame.

The aqueous composition used according to the invention may also comprise at least one surfactant, in particular chosen from the group of cationic or neutral charge surfactants and phospholipids, preferably surfactants of the Brij type, for example Brij 010, and soy lecithin.

Preferably, the aqueous composition comprises from 0.01% to 20% by weight of surfactant(s) relative to the weight of dry extract of the mixture formed by chitosan and the mineral filler.

The presence of surfactant(s), preferably biosourced, makes it possible, in particular, to improve the wettability of the coating on the support on which the composition will be applied, to avoid refusal of penetration of the formulation on the supports and to stabilize the particles (chitosan and mineral filler) in suspension.

The aqueous composition used according to the invention may also comprise at least one phosphorus additive, in particular chosen from the group of molecules having one or more phosphonic acid, phosphate or phosphonate groups.

According to one embodiment, the aqueous composition used according to the invention further comprises a phosphorus additive selected from the group consisting of ammonium polyphosphate, phytic acid and soy lecithin.

Preferably, the aqueous composition comprises from 0.01% to 20% by weight of phosphorus additive(s) relative to the weight of dry extract of the mixture formed by chitosan and the mineral filler.

The addition of at least one phosphorus additive may, in particular, make it possible to improve the fire retardancy of the composition.

According to one embodiment, the aqueous composition used according to the invention comprises from 75% to 99.99% by weight of water relative to the total weight of the composition.

Preferably, the aqueous composition used according to the invention comprises from 92.5% to 96.5% by weight of water relative to the total weight of the composition.

The present invention also relates to a method for preparing an aqueous composition as defined above, comprising a step of preparing a mixture comprising chitosan and at least one mineral filler, a step of adding water to the mixture, and optionally a step of adding at least one acid, and optionally at least one surfactant and/or at least one phosphorus additive.

The present invention also relates to a fire-retardant treatment method for a surface comprising wood, natural fibers, or synthetic fibers, comprising the application to said surface of an aqueous composition as defined above.

Thus, the method of the invention may be implemented on surfaces composed of wood fibers, natural fibers, or on surfaces of panels or solid wood. It may also be used on surfaces of synthetic fibers such as polyamides, polyesters, PE fibers or polyurethanes.

The method of the invention therefore consists, in particular, in applying the aqueous composition according to the invention all at once and thus the chitosan and the mineral filler(s) together. If necessary, this step may be repeated several times depending on the desired content of aqueous composition on the surface to be treated.

The method according to the invention therefore has the advantage of not requiring successive application of the various ingredients (chitosan and mineral filler).

The method of the invention may further comprise intermediate steps of drying and evaporation of water, after one or more step(s) of application of the aqueous composition according to the invention to the surface to be treated.

Among the surfaces to be treated, may be mentioned, for example, wood or wood-based surfaces, or surfaces made of natural fibers or fibers based on natural fibers. Mention may also be made of materials based on natural fibers, chosen in particular from the group of plant fibers or of materials based on plant fibers, preferably lignocellulosic fibers, cellulosic fibers and lignin-based materials, or the materials to be used of synthetic fiber base.

According to the present invention, by material (or surface) based on wood or natural fibers, is meant in a non-limiting manner solid wood materials, materials based on plant fibers and cellulosic materials, lignocellulosic and lignin based, including paper, cardboard, insulation board, chipboard, plywood board, MDF (Medium Density Fiberboard), OSB (Oriented Strand Board), cellulose wadding panels, and materials made from hemp, linen, straw, miscanthus, cotton, wool and silk.

According to the present invention, synthetic fiber material (or surface) is understood to mean, without limitation, polyamide, polyester, polyolefin, polyacrylic, polyvinyl or polyurethane materials.

According to one embodiment of the aforementioned method, the aqueous composition is applied by spraying or soaking.

The aqueous composition according to the invention may also be applied by brush, roller, spray, spraying, curtain coating, roller coating, dip impregnation, autoclave impregnation, or for higher viscosities, by extrusion-molding-compression molding, projection, or trowel, as for a coating.

Thus, the present invention also relates to the use of a conventional method of application of the above-mentioned formulation (comprising chitosan and at least one inorganic filler) to create a fire-retardant coating: wherein the formulation may be deposited—by liquid impregnation on the surface of by spraying a material.

The present invention also relates to a mass fire-retardant treatment method for a material comprising wood, natural fibers or synthetic fibers, wherein the method comprises the addition, during the production of the material, of an aqueous composition to the constituent elements of the material defined above before it is formed, for example before it is formed into a panel.

This embodiment of mass treatment is advantageous in that it allows a combined effect of bonding the fibers together and fireproofing.

Among the materials to be treated, mention may be made, in particular, of those mentioned above such as materials based on wood or natural fibers and materials based on synthetic fibers.

The present invention further relates to the aforementioned aqueous compositions as such.

Thus, the present invention relates to an aqueous composition comprising chitosan and at least one mineral filler, in which the content by weight of chitosan is between 20% and 99.99% by weight relative to the weight of dry extract of the mixture formed by the chitosan and the inorganic filler, while the content by weight of inorganic filler is between 0.01% and 80% by weight relative to the weight of dry extract of the mixture formed by chitosan and the mineral filler.

According to one embodiment, the aqueous composition according to the invention further comprises at least one acid, in particular chosen from the group consisting of acetic acid, hydrochloric acid, formic acid, L-ascorbic acid, L-glutamic acid, lactic acid, maleic acid, malic acid and succinic acid, and mixtures thereof.

The solid line curve with the black diamonds corresponds to the panel alone, the solid line curve with black squares corresponds to a Teknosafe paint-coated panel (1), while the solid line curve with black triangles corresponds to a panel coated with Teknosafe paint (2), the dotted line curve with stars and the dotted line curve with white squares correspond to panels coated with a formulation comprising 60% of chitosan and 40% of talc, the dotted line curve with white circles and dotted curve with white diamonds correspond to panels coated with a formulation comprising 60% chitosan and 40% Nanoclay montmorillonite, while the dotted line curve with white triangles and the dotted line curve with crosses correspond to panels coated with a formulation comprising 60% of chitosan and 40% of montmorillonite K10.

Figure 2:
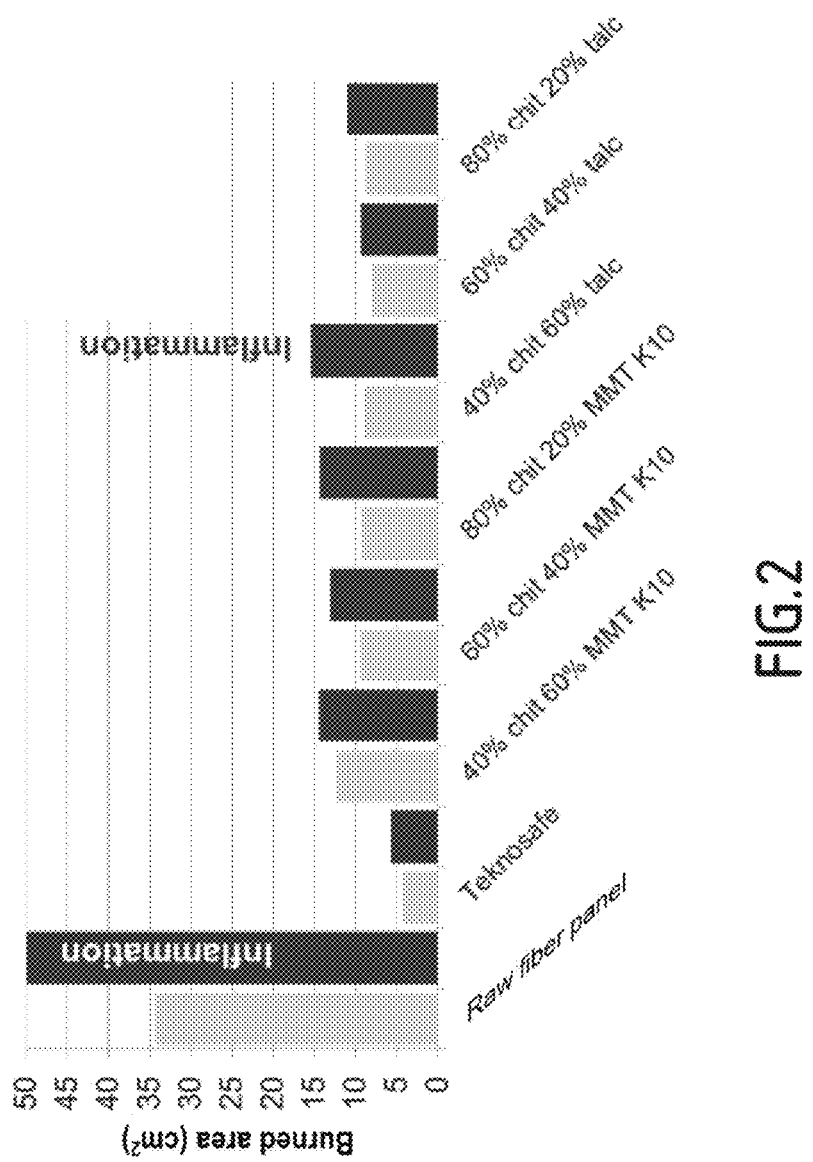

FIG. 2 shows the results of the ignitability test on 160 kg/m$^3$ (d3) density panels: measurements of the carbonized area according to the type of coating applied and the flame exposure time. The gray columns correspond to a 30-second exposure while the black columns correspond to a 1-minute exposure.

Figure 3:
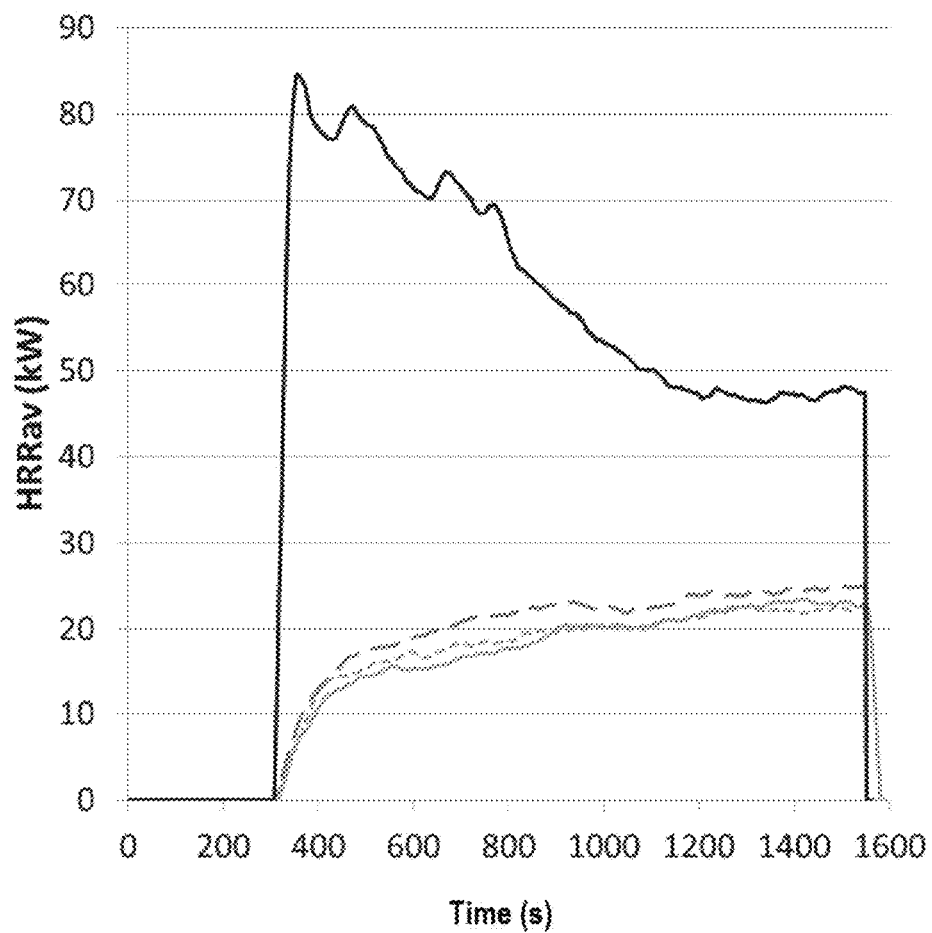

FIG. 3 relates to heat transfer curves (HRR) obtained for the SBI type tests on wood fibreboard (density of 140 kg/m$^3$) (d4) beveled at 45° untreated and treated by spraying with an aqueous formulation based on talc and chitosan (Aldrich source or GTC Bio). The black solid curve corresponds to the raw panels, the gray solid curve corresponds to the panels treated with an aqueous Aldrich-based talc and chitosan formulation (test 1), the gray dotted curve corresponds to the panels treated with an aqueous Aldrich-based talc and chitosan formulation (test 2), while the gray semi-dotted curve corresponds to the panels treated with an aqueous formulation based on talc and chitosan from GTC Bio source (IGC-5).

Figure 4:
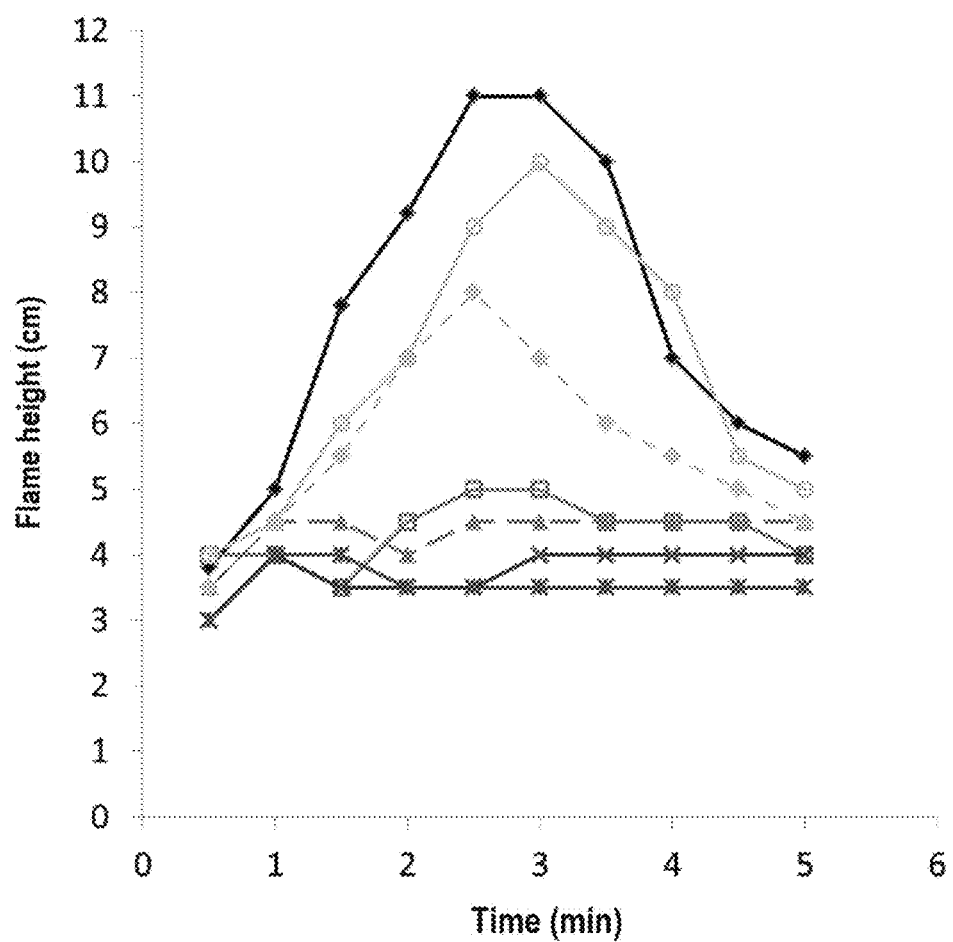

FIG. 4 relates to the monitoring of flame height versus time for particle board ignitability tests (the compositions correspond to those described in Table 8 described later).

The solid line curve with the black diamonds corresponds to the single panel, the curve in solid lines with white squares and the curve in solid line with black triangles correspond to panels treated with an aqueous formulation whose dry extract is composed of 100% of chitosan (tests 1 and 2), the curve in solid lines with white circles and the dashed curve with black rhombs correspond to panels treated with an aqueous formulation whose dry extract is composed of 20% of chitosan and 80% montmorillonite K10 (tests 1 and 2), while the curve in solid lines with stars and the dashed curve with crosses (x) correspond to panels treated with an aqueous formulation whose dry extract is composed of 60% chitosan and 40% montmorillonite K10 (tests 1 and 2).

DETAILED DESCRIPTION OF EMBODIMENTS

Materials

The first screening tests were carried out on wood particle boards. The d2 density fibreboard is PAVATEX type PAVABOARD panels with a density of 200 kg/m$^3$ and 60 mm thickness, while d3 density fibreboard is STEICO top type with a density 160 kg/m$^3$ and 100 mm thick. The d4 density fibreboard is STEICO special dry type panels with a density of 140 kg/m$^3$ and 80 mm thickness.

Chitosan was purchased from Aldrich (low molecular weight grade) (Mn=75,750 g/mol, degree of deacetylation measured (DD, %) of 87.3%).

Two batches of industrial grade chitosan were supplied by GTC Bio, batch IGC-3 (Mn=65 090 g/mol with a degree of deacetylation indicated by the industrialist of 87.6%) and lot IGC-5 (Mn=147 900 g/mol with a degree of deacetylation indicated by the industrialist of 86.1%).

The Luzenac 10M2 talcum powder was supplied by Imerys Talc.

The Montmorillonite K10 was purchased from Aldrich.

The glacial acetic acid grade Reagent Plus comes from Aldrich.

The intumescent commercial formulation Teknosafe, used as a reference, was provided by Teknos.

All products were used as is, without additional purification.

Preparation of the Formulation

Chitosan and mineral filler (60/40 weight ratio, for example) were placed in a container. The permutated water was then added to obtain a formulation with 3.75% (w/w) solids. The pH was then adjusted to between 4 and 4.5 by adding small volumes of 99% acetic acid.

Preparation Example 180 g of chitosan (low MW, Aldrich) and 120 g of mineral filler (Luzenac talc 10M2, Imerys talc) were placed in a 15 L bucket. A volume of 8 L of deionized water was then poured in and 54 g of 99% acetic acid were added per fraction to the solution with mechanical stirring to make the chitosan soluble.

The formulation was then homogenized by means of a mechanical stirring blade for 48 hours, at room temperature. Following the gradual decantation of the mixture over time, the formulation was again homogenized just before application using a paint disperser equipped with a spiral mixing rod or a deflocculating turbine.

Other formulations were prepared with chitosans other than those mentioned above and results similar to those described later have been obtained.

Coating Application

Liquid Application

For samples to be tested for ignitability, 60 mL of formulation was poured onto the panel surface (25×9 cm) and spread with a brush. To limit the flow of the formulation on the edges of the panel, the sample was surrounded by parchment paper or aluminum foil held in a foam mold. The samples were dried at room temperature under a fume hood (0.4 m/s) for 24 hours and then in a vacuum oven (−30 in·Hg) for 8 hours at 40° C.

Spray Application

The kinematic viscosity of the formulation was evaluated by measuring the flow time (1 min 50 s) in an AFNOR #4 flow viscosity cup. The formulation was sprayed using a 4 bar piston pump with a 33/1 pressure ratio and a Binks gun. The formulation was cross-applied to the surface of wood fibreboard placed horizontally to reach the targeted basic wet weight.

For the d2 and d3 density panels, the product was applied in a single layer. The panels were dried in an oven for 24 hours at 40° C. (0.53 m/s, 80% fresh air). The panels were then cut into pieces of 100×100 mm depending on the test to be performed (cone calorimeter).

For the d4 density panels, the product was applied in two layers: the first layer was cross-applied to a basic wet weight of approximately 600 g/m$^2$, and then the panel was dried horizontally in an oven for 1 h30 at 60° C. (about 0.5 m/s, 100% fresh air as oven ajar), then the operation was repeated a second time to obtain a final wet weight of about 1200 g/m$^2$.

Climate Aging

Aging was carried out according to the NF P92-512 standard "Fire safety—Building—Reaction to fire tests of materials—Determination of the durability of fire reaction classifications of materials—Tests".

The samples were submitted to 4 cycles of a duration of two weeks each.

After stabilization at 50% relative humidity and a temperature of 23° C. until a constant mass at 2% is obtained, the samples are subjected alternately (at 23±3° C.): 4 days at 90% of relative humidity, three days at 15% relative humidity, three days at 90% relative humidity and four days at 15% relative humidity, so that the times passed in each condition are similar in every other cycle.

After the last cycle, the samples are returned to atmosphere at 50% relative humidity and 23° C. temperature until stabilization, which is verified by a constant mass to 2%.

Upon leaving the conditioned chamber, the samples are submitted to regulatory fire reaction tests.

Fire Reaction Tests

The samples were conditioned for at least 48 hours in a climatic chamber at 23° C. and 50% humidity before being tested for reaction to fire (in accordance with standard NF EN 13238 "Reaction to fire tests of construction products—Packaging procedures and general rules for the selection of substrates").

Ignitability

The test was conducted according to the methodology described in standard NF EN ISO 11925-2: "Reaction to fire tests—Ignitability of building products subjected to the direct impact of the flame—Part 2: Test with the aid of 'a single flame source'. This test makes it possible to evaluate the ignitability of a product exposed to a low thermal load simulated by a small flame.

For the particle board tests, the samples were exposed to flame for 5 minutes. The flame height (in cm) as a function of time was evaluated visually according to the graduations in cm plotted on the sample.

For the same sample of wood fiber board, one replica was exposed to the flame for 30 seconds while the second replica was exposed for 1 minute. After the test, the samples were photographed horizontally by means of a camera placed vertically. The charred surface was evaluated by image processing of these photographs using the NIVision software.

Cone Calorimeter

The test was conducted according to the methodology described in ISO 5660-1: 2002: "Reaction to fire tests—Heat release, smoke release rate and mass loss rate—Part 1: Heat transfer rate (cone calorimeter method) and smoke release rate (dynamic measurement)". The test consists in evaluating the heat flow rate and the dynamic smoke release rate of horizontally oriented specimens exposed to irradiance levels controlled by an external source. The samples were exposed to a heat flux of 35 or 50 kW/m$^2$. For each sample, 2 replicas were analyzed. A restraining frame was used, therefore the exposed area was 88.4 cm$^2$. The heat rate was determined by measuring the oxygen consumption, as well as the flow rate in the flue of the combustion products. Ignition time (persistent flame) was also measured during this test. The following indices were obtained:

tig: ignition delay

PHRR: Peak of Heat Release Rate ("Peak of Heat Release Rate")

THR: total energy released after 600 s of test (Total Heat Release)

Max HRR30 s: average heat output over 30 s maximum test (HRR30 s=RHR30 s)

Single Burning Item (SBI)

The test was inspired by the methodology described in the standard "NF EN 13823—Reaction to fire of building materials—Building materials" with the exception of floor coverings—exposed to thermal stress caused by an isolated object on fire. The specimen consisting of two vertical wings (1.50 m high and 0.50 m wide) forming a right angle was exposed to flames from a main burner placed at the bottom of the corner. The flames are obtained by burning propane gas injected through a bed of sand and producing a heat flow of 30.5 (+/−2) kW. The performance of the test piece was evaluated over a period of 21 minutes. The performance criteria are: heat generation and flame front propagation. The propagation of the flame front was estimated by visual observation. These quantities were automatically recorded and used for the calculation of the following indices:

FIGRA (W/s): Fire Development Index

THR600 s (MJ): Total energy released between 300 and 900 seconds

Results

I—Ignitability

Screening on Particle Board

The study was carried out on particle board coated with formulation (dry extract composed of 60% chitosan and 40% mineral filler) by liquid application. The dry weights obtained are listed in Table 1 below.

3 types of mineral fillers were tested: talc (non-exfoliable silicate), montmorillonite Nanoclay (classic, exfoliable, with $Na^+$ counter-ions) and montmorillonite K10 (treated HCl, exfoliable, $H^+$ counter-ions).

The formulations were compared to a commercial intumescent paint for wood, Teknosafe.

Figure 1:
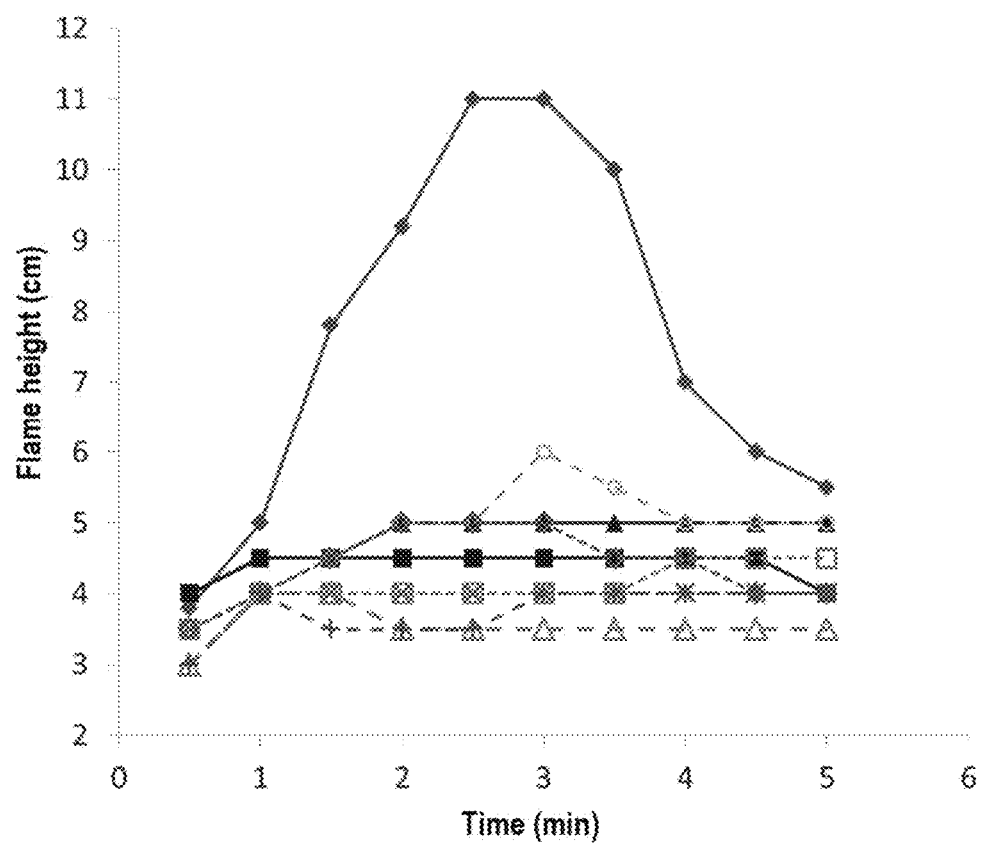
FIG. 1 relates to the monitoring of the flame height as a function of the time for ignitability tests on particle boards (the compositions correspond to those described in Table 1 below).

The samples were exposed to the flame for 5 min during which the flame height was read every 30 s. The results are shown in FIG. 1.

TABLE 1

Quantity of residual formulation, after drying, on the surface of particle board samples for ignitability tests.

| Composition | Dry grammage (g/m$^2$) |
|---|---|
| Teknosafe-1 | 175 |
| Teknosafe-2 | 167 |
| 60% chitosan 40% talc | 24 |
| 60% chitosan 40% talc | 25 |
| 60% chitosan 40% Nanoclay | 33 |
| 60% chitosan 40% Nanoclay | 29 |
| 60% chitosan 40% MMT K10 | 94 |
| 60% chitosan 40% MMT K10 | 125 |

Although the amount of formulation varies from one sample to another (see Table 1 above) because of the poorly controlled application method, the flame heights are significantly reduced compared to those measured for the raw panel, whatever the coating considered. The flame heights for the formulations according to the invention are of the order of magnitude of those obtained for the Teknosafe paint. The flame heights measured for the formulation containing MMT K10 are lower because of the higher basis weight.

Screening on Fiberboard

The study was carried out on panels of density d3 (160 Kg/m$^3$) coated with formulation by liquid application. The results are shown in FIG. 2. Although the amount of formulation varies from one sample to another (see Table 2) because of the mode of application, the formulation containing 60% of chitosan and 40% of talc (percentage dry extract) shows the smallest charred surfaces after exposure to the flame. At equivalent grammage, the 60% chitosan 40% mineral filler formulations may be compared with each other, as well as the 80% chitosan and 20% mineral filler formulations. Both these comparisons show better results in the case of talc. Despite a higher grammage than that of the 80% chitosan 20% talc formulation, the 40% chitosan 60% talc formulation ignites after 1 min of exposure, unlike the 80% chitosan 20% talc formulation, which does not ignite in the analysis time.

TABLE 2

Quantity of residual formulation, after drying, on the surface of small-flame-tested wood-fiber panel samples (ignitability test).

| composition | dry grammage (g/m$^2$) |
|---|---|
| Teknosafe | 329 |
|  | 349 |
| 40% chitosane 60% MMT K10 | 81 |
|  | 62 |
| 60% chitosan 40% MMT K10 | 172 |
|  | 206 |
| 80% chitosan 20% MMT K10 | 87 |
|  | 102 |
| 40% chitosan 60% talc | 143 |
|  | 119 |
| 60% chitosan 40% talc | 169 |
|  | 197 |
| 80% chitosan 20% talc | 105 |
|  | 110 |

II—Cone Calorimeter d2 Density Panels (200 kg/m$^3$)

The 60% chitosan 40% talc formulation was applied to the panels by spraying to a wet weight of about 500 or 800 g/m$^2$. A part of the panels treated at 800 g/m$^2$ was subjected to climatic aging for 8 weeks, then analyzed with a cone calorimeter.

Before Climatic Aging

The samples were subjected to a thermal flux of 50 kW/m$^2$. The parameters calculated from the heat flow rate curves (HRR) obtained are summarized in Table 3 below.

Although the coating barely increases the ignition time (tig), the peak heating rate (PHRR), representative of the surface effect, decreases markedly as the grammage increases. This decrease of the PHRR with the amount of surface product proves the effectiveness of the coating. The total energy released over 600 s (THR (600 s), area under the HRR curve over 600 s of test) is only slightly influenced by the coating because it represents more the effect of the mass on the reaction properties to fire.

TABLE 3

Cone calorimeter data obtained for raw and treated d2 panels prior to weathering. tig is the ignition time, PHRR represents the heat flow peak, and THR (600 s) indicates the total energy released after 600 s of test. The samples were subjected to a thermal flux of 50 kW/m$^2$.

| | sample | heat flux (kW/m$^2$) | tig (s) | PHRR (kW/m$^2$) | THR(600 s) (MJ/m$^2$) |
|---|---|---|---|---|---|
| Before aging | d2-raw | 50 | 6 | 230 | 46 |
| | d2-567 g/m$^2$ | 50 | 5 | 166 | 48 |
| | d2-793 g/m$^2$ | 50 | 9 | 119 | 40 |

After Climatic Aging

The samples were subjected to a thermal flux of 35 kW/m$^2$. The parameters calculated from the heat flow rate curves (HRR) obtained are summarized in Table 4 below. Even when aged, the coating helps to increase the ignition time (tig), from 13 to 19 s after treatment. The heat flow peak (PHRR), representative of the surface effect, is largely decreased with the coating. This drop in PHRR, coupled with the slight increase in tig after treatment, confirms the effectiveness of the coating, even after aging. The total energy released over 600 s (THR (600 s), area under the HRR curve over 600 s of test) is still only slightly influenced by the coating because it represents more the effect of the mass on the properties of reaction to fire.

TABLE 4

Cone calorimeter data obtained for raw and treated d2 panels, after climatic aging. tig is the ignition time, PHRR represents the heat flow peak, and THR (600 s) indicates the total energy released after 600 s of test. The samples were subjected to a thermal flux of 35 kW/m².

| | sample | heat flux (kW/m²) | tig (s) | PHRR (kW/m²) | THR (600 s) (MJ/m²) |
|---|---|---|---|---|---|
| After aging | d2-gross aged | 35 | 13 | 193 | 34 |
| | d2-793 g/m² aged | 35 | 19 | 94 | 32 | d3 Density Panels (160 kg/m³)

The samples were subjected to a thermal flux of 50 kW/m². The parameters calculated from the heat flow rate curves (HRR) obtained are summarized in Table 5 below. The coating contributes to increase the ignition time (tig), from 2 to 4 s after treatment. The heat flow peak (PHRR), representative of the surface effect, is halved with the coating. This drop in PHRR, coupled with the slight increase in tig after treatment, confirms the efficacy of the coating. The total energy released over 600 s (THR (600 s), area under the HRR curve over 600 s of test), is only slightly influenced by the coating because it represents more the effect of the mass on the reaction properties to fire.

TABLE 5

Cone calorimeter data obtained for raw and treated d3 panels. tig is the ignition time, PHRR represents the heat flow peak, and THR (600 s) indicates the total energy released after 600 s of test. The samples were subjected to a thermal flux of 50 kW/m².

| sample | heat flux in kW/m² | tig (s) | PHRR (kW/m²) | THR (600 s) (MJ/m²) |
|---|---|---|---|---|
| d3-raw | 50 | 2 | 248 | 43 |
| d3-800 g/m² | 50 | 4 | 116 | 42 |

III—Single Burning Item (SBI): Fire Reaction Test for Euroclass Classification (d4 Density Panels 140 kg/m³)

Tests were carried out on panels treated with the formulation with talc and based on chitosan (Aldrich) and chitosan GTCBio (GTC Bio IGC-5, DD (%)=86.1% (supplier data, DD (%))=90.7%. Measured by 1H NMR) (Mn=147,900 g/mol), the panels having been cut beforehand at 45° to optimize the angle, and raw panels.

Quantity of Formulation

The models consist of 2 panels positioned at a 90° angle, each measuring 150×50 cm. The formulation was spray applied to the surface of d4 density panels.

One of the fields in the length was cut at a 45° angle to optimize angle mounting. Only one face and the 45° field were treated. The amount of product actually sprayed on the surface of the panels is given in Table 6.

TABLE 6

Quantity of formulation applied to the surface of density boards d4 (140 kg/m3) tested. The basic dry weight was estimated using the dry extract value of 3.6%.

| | panel N° | 1st layer (g/m²) | 2nd layer (g/m²) | Total wet (g/m²) | Total dry (g/m²) |
|---|---|---|---|---|---|
| Chitosan (Aldrich) | 1 | 597 | 620 | 1217 | 43.81 |
| | 2 | 720 | 482 | 1202 | 43.27 |
| | 3 | 560 | 660 | 1220 | 43.92 |
| | 4 | 580 | 710 | 1290 | 46.44 |
| Chitosan GTCBio IGC-5 | 5 | 628 | 582 | 1210 | 43.56 |
| | 6 | 640 | 586 | 1226 | 44.13 |

SBI Test Results

The SBI test measures the heat flow rate (HRRav) produced by the sample as it burns by the burner as a function of time (FIG. 3). From these data are calculated:

the fire growth rate (FIGRA), characterized by the highest slope recorded on the HRRav curve as a function of time, the total energy released after 600 s of test (THRta), area under the HRR curve as a function of time from 300 s to 900 s), characteristic of fireproofing in the mass.

The calculated parameters and the resulting Euroclass classification are given in Table 7.

As indicated above, the panels were beveled at 45° and treated with two different types of chitosan: Aldrich chitosan (Mn=75,750 g/mol, Mw/Mn=2.3) and chitosan from GTCBio (Mn=147,900 g/mol and Mw/Mn=1.8). In view of the HRRav curves (FIG. 3), the angle design with the 45° bevels significantly reduced the THR values, since the opposite (untreated) face hardly ignited (no HRR jump).

The heat transfer curves (HRR) obtained for the SBI tests on panels treated at 1200 g/m² with Aldrich chitosan (45° beveled), the panels treated with chitosan GTCBio IGC-5 (beveled at 45°), and untreated raw panels (45° beveled panels) are shown in FIG. 3.

TABLE 7

Results obtained for SBI type tests on panels treated with an Aldrich chitosan-based formulation and talc (tests with 45° beveled panels), panels treated with a GTCBio IGC chitosan formulation-5, and talc (with 45° beveled panels) and rough panels (45° beveled panels).

| Sample | Wet grammage (g/m²) | THRta (t0_t0 + 600 s) [MJ] | Est. Class THRta | FIGRA [W/s] | Est. Class FIGRA | Retained class |
|---|---|---|---|---|---|---|
| Untreated raw panel-45° bevel | — | 41.8 | D | 1 902.59 | E | E |
| chitosan Aldrich bevel 45°-test 1 | 1 200 | 8.5 | C | 108.24 | B | C |
| chitosan Aldrich bevel 45°-test 2 | 1 200 | 9.2 | C | 127.87 | C | C |
| chitosan GTCBio IGC-5 45°-bevel | 1 200 | 10.5 | C | 145.95 | C | C |

The Euroclass ranking is based on the values of FIGRA and THR. Panels treated with formulations based on 2 sources of chitosan and talc are classified C with respect to the untreated raw panel which is classified E. An applied wet weight of 1200 g/m² is sufficient to reach class C.

IV—Particle Board Ignitability Tests

The study was carried out on coated particle boards of aqueous formulation (whose dry extract is composed of 100% chitosan or 60%/40% acid-treated chitosan/montmorillonite (MMT K10) by liquid application).

60 mL of formulation was poured onto the panel surface (25×9 cm) and spread with a brush. To limit the flow of the formulation on the edges of the panel, the sample was surrounded by parchment paper or aluminum foil held in a foam mold. The samples were dried at room temperature under an extractor hood (0.4 m/s) for 24 hours and then in a vacuum oven. (−30 in·Hg) for 8 h at 40° C. Dry grammages obtained after evaporation of water are listed in Table 8. The samples were exposed to the flame for 5 min during which the flame height was read every 30 s. The results are shown in FIG. 4.

TABLE 8

Quantity of residual formulation, after drying, on the surface of particle board samples for ignitability tests.

| Sample | Grammage dry (g/m²) |
|---|---|
| 100% chitosan - test 1 | 114 |
| 100% chitosan - test 2 | 182 |
| 20% chitosan 80% MMT K10 - test 1 | 62 |
| 20% chitosan 80% MMT K10 - test 2 | 78 |
| 60% chitosan 40% MMT K10 - test 1 | 94 |
| 60% chitosan 40% MMT K10 - test 2 | 125 |

Comparative Example

The same composition as that of the Preparation Example under Preparation of the formulation is carried out by replacing the acetic acid with the same amount of ricinoleic acid.

Rheological and wettability tests are performed, as well as fire-retardant tests.

These tests show results different from those obtained with a composition according to the invention as described above.

The invention claimed is:

1. A fire-retardant treatment method of a surface comprising the application on said surface of an aqueous composition consisting of water, chitosan, at least one mineral filler, said mineral filler being talc, and at least one acid selected from the group consisting of: acetic acid, hydrochloric acid, formic acid, L-ascorbic acid, L-glutamic acid, lactic acid, maleic acid, malic acid, and succinic acid, and mixtures thereof, and optionally at least one surfactant and/or at least one phosphorus additive.

2. The method according to claim 1, wherein the acid is acetic acid.

3. The method according to claim 1, wherein the content by weight of chitosan is between 20% and 99.99% by weight relative to the weight of dry extract of the mixture formed by chitosan and the mineral filler, and the content by weight of mineral filler is between 0.01% and 80% by weight relative to the weight of dry extract of the mixture formed by chitosan and the mineral filler.

4. The method according to claim 1, wherein the aqueous composition comprises from 0.01% to 25% by weight of dry extract of the mixture formed by chitosan and the mineral filler with respect to the total weight of the composition.

5. The method according to claim 1, wherein the aqueous composition has an acidic pH.

6. The method according to claim 1, wherein the number-average molar mass of chitosan is between 50,000 g/mol and 200,000 g/mol.

7. The method according to claim 1, wherein the degree of deacetylation of chitosan is between 75% and 95%.

8. The method according to claim 1, wherein the aqueous composition has a dynamic viscosity measured at 25° C. and a shear rate of 2 s$^{-1}$ between 0.1 Pa·s and 1000 Pa·s.

9. The method according to claim 1, wherein the aqueous composition comprises from 75% to 99.99% by weight of water relative to the total weight of the composition.

10. The method of fire-retarding a surface of claim 1, the surface comprising wood, natural fibers or synthetic fibers.

11. The method of claim 10, wherein the aqueous composition is applied by dipping or spraying.

12. The method according to claim 2, wherein the content by weight of chitosan is between 20% and 99.99% by weight relative to the weight of dry extract of the mixture formed by chitosan and the mineral filler, and the content by weight of mineral filler is between 0.01% and 80% by weight relative to the weight of dry extract of the mixture formed by chitosan and the mineral filler.

13. The method according to claim 1, wherein the content by weight of chitosan is between 20% and 99.99% by weight relative to the weight of dry extract of the mixture formed by chitosan and the mineral filler, and the content by weight of mineral filler is between 0.01% and 80% by weight relative to the weight of dry extract of the mixture formed by chitosan and the mineral filler.

14. The method according to claim 2, wherein the aqueous composition comprises from 0.01% to 25% by weight of dry extract of the mixture formed by chitosan and the mineral filler with respect to the total weight of the composition.

15. The method according to claim 1, wherein the aqueous composition comprises from 0.01% to 25% by weight of dry extract of the mixture formed by chitosan and the mineral filler with respect to the total weight of the composition.

16. The method according to claim 3, wherein the aqueous composition comprises from 0.01% to 25% by weight of dry extract of the mixture formed by chitosan and the mineral filler with respect to the total weight of the composition.

17. The method according to claim 1, wherein the aqueous composition has a pH between 3 and 6.

18. A method for the fire-retardant treatment in the mass of a material comprising wood, natural fibers or synthetic fibers, wherein the method comprises the addition during the manufacture of the material of an aqueous composition as defined in claim 1 to the constituent elements of the material before it is formed.

19. The method of mass fire-retardant treatment of a material according to claim 18, wherein the formation is a formation into a panel.

* * * * *